United States Patent

Hsu et al.

[11] Patent Number: 5,875,181
[45] Date of Patent: Feb. 23, 1999

[54] PACKETIZED CDMA/TDM SATELLITE COMMUNICATION SYSTEM

[75] Inventors: Liang Hsu, Edison; Ashok N. Rudrapatna, Basking Ridge; Matthew J. Sherman, North Arlington; Gabriel Valdez, Jersey City, all of N.J.

[73] Assignee: AT & T Corp., Middletown, N.J.

[21] Appl. No.: 968,186

[22] Filed: Nov. 12, 1997

Related U.S. Application Data

[63] Continuation-in-part of Ser. No. 683,339, Jul. 18, 1996, abandoned.

[51] Int. Cl.⁶ .............................. H04B 7/212; H04B 7/216
[52] U.S. Cl. ........................... 370/320; 370/321; 370/325
[58] Field of Search ..................................... 370/316, 320, 370/321, 323, 34, 325, 330, 335, 337, 342, 347, 395, 479, 336; 375/200, 206; 455/13.1, 13.2, 13.3

[56] References Cited

U.S. PATENT DOCUMENTS

| | | | |
|---|---|---|---|
| 4,425,639 | 1/1984 | Acampora et al. | 370/323 |
| 5,084,900 | 1/1992 | Taylor | 370/320 |
| 5,245,612 | 9/1993 | Kachi et al. | 370/324 |
| 5,539,730 | 7/1996 | Dent | 370/330 |
| 5,553,069 | 9/1996 | Ueno et al. | 370/325 |
| 5,566,164 | 10/1996 | Ohlson | 370/320 |

OTHER PUBLICATIONS

T.Scarcella & R.V. Abbot, "Orbital Efficiency Through Satellite Digital Switching", IEEE Communications Magazine, 1983, pp. 38–46.

FCC, Washington, DC, Sep. 29, 1995 "Application of AT & T Corp. for Authority to Construct, Launch, and Operate the VoiceSpan System of Twelve Satellites in the Ka–Band Domestic and International Fixed–Satellite Service and to Construct Four Partial Ka–band Satellite Ground Spares", (Summary, Table of Contents, AT & T Application (pp. 1–97), Appendices A–G).

*Primary Examiner*—Chau Nguyen
*Attorney, Agent, or Firm*—Alfred G. Steinmetz

[57] ABSTRACT

In a satellite communication system a CDMA uplink signal including user data is transmitted in a packetized manner, the packets are switched on board the satellite by a packet switch before its downlink delivery. The packet switch routes the packets to the appropriate one of several outgoing downlink beams based on address information included in the packet header. Time Division Multiplexing (i.e., TDM) is used for downlink transmission. This invention constitutes an efficient multi-user satellite based communication system.

2 Claims, 2 Drawing Sheets

PACKETIZED CDMA/TDM SATELLITE COMMUNICATION SYSTEM

This application is a continuation-in-part of application Ser. No. 08/683,339, filed on Jul. 18, 1996, now abandoned.

FIELD OF THE INVENTION

This invention relates to satellite communication systems and in particular to such a system using a combination of packetized CDMA (i.e., Code Division Multiple Access) uplink, on-board packet switching, and TDM (i.e., Time Division Multiplexing) downlink transmission.

BACKGROUND OF THE INVENTION

Communication access schemes using satellite connections are commonly accomplished by FDMA (i.e., Frequency Division Multiple Access) and TDMA (i.e., Time Division Multiple Access) processing techniques. Often the uplink signal is transmitted to the destination by the satellite utilizing bent pipe techniques meaning that the satellite performs merely as a repeater without performing any on-board switching or multiplexing function. Hence all switching and associated control must be performed at transmitting and receiving end stations on the ground. This limits the flexibility of the system since the intelligence of the system is concentrated in the ground end stations. CDMA is also used in satellite applications but the previous lack of satellite on-board processing has prevented the invention of hybrid systems that use different types of air interfaces for the uplink and downlink.

Traffic in systems such as voice/multimedia tends to be bursty in nature; a circumstance not favorable to TDMA and FDMA modes of transmission. Using a TDMA and FDMA mode of transmission is unsatisfactory because the assignment of time slots and/or frequency channels requires a setup time that is unacceptable in many applications. Also, changing the allocation of slots/frequency to meet transient demands is a complex process resulting in complex system control.

SUMMARY OF THE INVENTION

A satellite communication system, according to the invention, provides a unique combination of CDMA ground to Air Interface, packetized transmission and switching (e.g., Asynchronous Transfer Mode) on board the satellite and TDM downlink transmission as recited in the claims.

In systems with bursty traffic, packet switching is particularly advantageous because of its asynchronous nature in accepting signals. Variations in signal arrival are easily accommodated. Packetized CDMA is an efficient way to transmit bursty traffic from different locations using a wireless channel.

The capacity of a CDMA system greatly depends on the interference caused by other users. If the traffic is bursty and packets are sent only when there is information to be transmitted, the interference caused to other users is minimized and the number of users the system can support is increased. It also has the advantage that beyond initial set-up of the circuit, no additional signaling or setup time are required to implement a data burst and/or data rate changes for a subscriber therefore providing bandwidth on demand capabilities.

In a CDMA system spreading codes need to be assigned to individual users that want to transmit information. Availability of spreading codes in typical implementations, in fact, greatly exceeds the capacity of the air interface to carry specific numbers of simultaneous channels. Use of CDMA advantageously permits active channels in excess of capacity to degrade gracefully as system utilization is overgrown.

One of biggest limitations in the design of a satellite system is the power that is available in the satellite. Multi-carrier systems such as CDMA need to operate with low levels of efficiency in order to avoid intermodulation distortion making these systems power inefficient. By using Time Division Multiplexing (TDM) on the downlink the system becomes more power efficient while it maintains the multiple Access benefits of CDMA.

In a particular embodiment of the invention ATM packets in a CDMA uplink signal including user data are processed and switched on board a satellite by ATM switching included within the satellite before its downlink delivery. The ATM switch routes the ATM packets to an appropriate one of several outgoing downlink beams based on address information included in the packet header. Down link signal is transmitted by Time Division Multiplex (i.e., TDM) processing.

DETAILED DESCRIPTION

Figure 1:
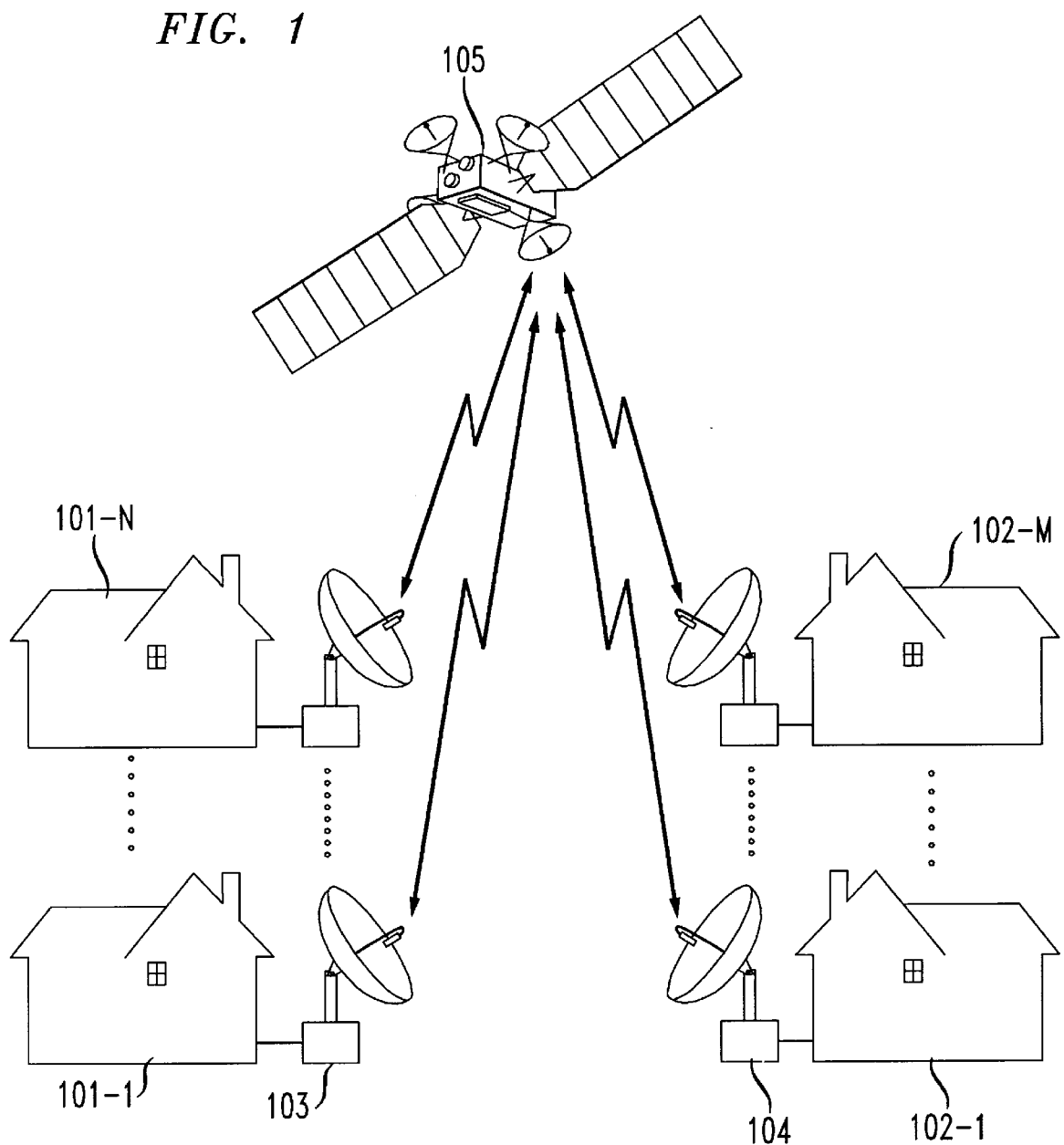
FIG. 1 is a schematic of a satellite communication system.
Figure 2:
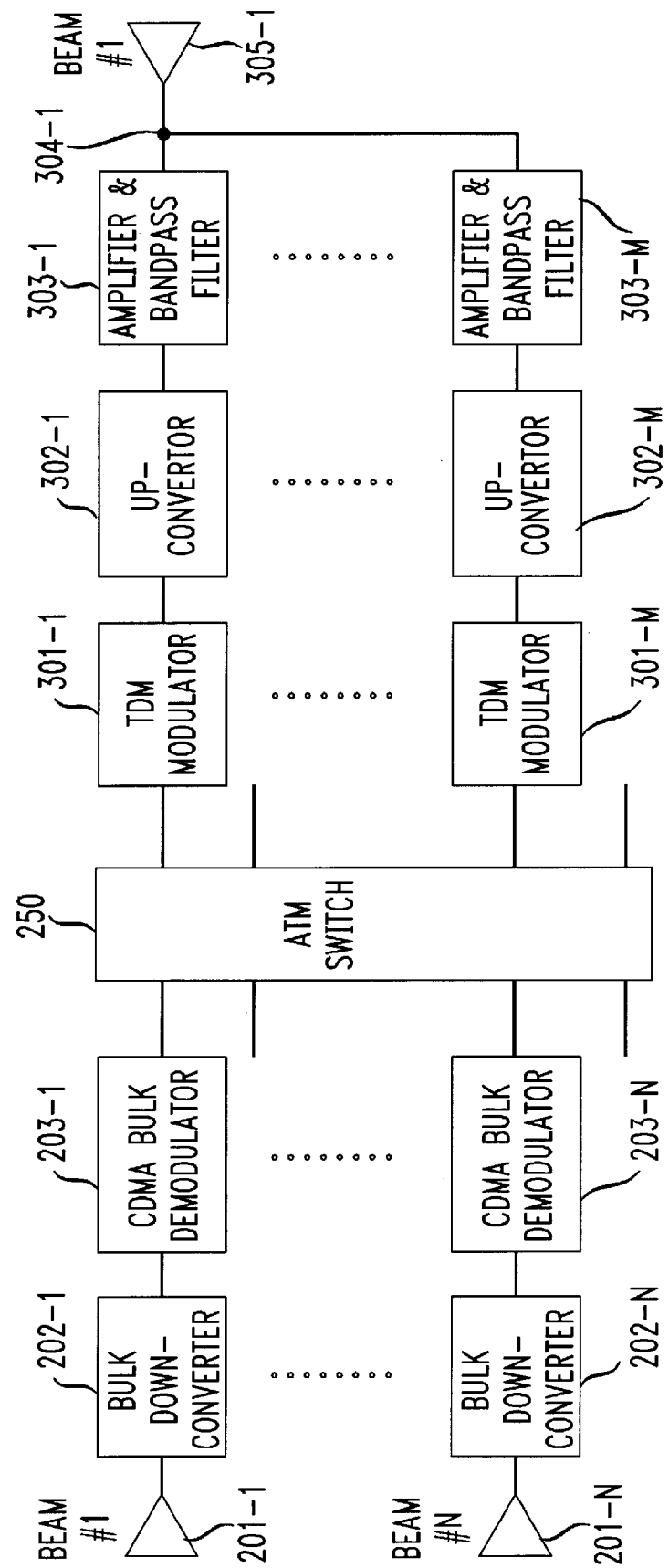
FIG. 2 is a block schematic of one embodiment of the uplink, demodulation and switching circuitry of the satellite; and downlink processing circuitry of the satellite.

An illustrative satellite communication system coupling a transmitting user earth station to a receiving user earth station is shown schematically in FIG. 1. The satellite has multiple spot-beams for transmitting and receiving. Any user in any beam can communicate with any other user in the same or different beam.

Earth station as used herein describes transmitting and receiving units that communicate directly with a similar earth station, via a satellite. In most cases the earth station uses a dish antenna. Channel is a generic term used to describe a frequency spectrum used for signal transmission as well as the propagation characteristics of that signal. Uplink signals are those from ground to satellite and regarding signals from the area covered by the satellite's uplink beam antenna. Downlink beams are transmitted from the satellite to the area covered by the downlink beam antenna.

While illustratively depicting individual transmitting and receiving stations 101 and 102 respectively the stations could be simultaneously transmitting points and receiving points of a communication system. These stations could be either fixed spatially/geographically or mobile, although in this specific embodiment they are shown to be fixed on the earth while communicating. Further the stations could be bi-directional transceivers. Only uni-directional is shown for simplicity.

Station 101-1 includes a satellite dish antenna 103 which directs a packetized RF CDMA signal to a satellite 105. Once the link is established between the satellite 105 and the earth station 101-1, which includes code synchronization, the transmitter on Station 101-1 will only send RF signals when there is a packet of information to be transmitted or when it needs to send a packet to maintain synchronization. Station 102-1 receives a TDM RF signal that contains packetized information from the satellite 105 via its accompanying satellite dish antenna 104. Each beam includes a plurality of frequency bands. As shown the satellite receives RF CDMA beam signals from other transmitting stations 101-N and transmits RF TDM signals to a plurality of receiving stations 102-M. The uplink represents a synchronous CDMA system where all the user's signal arrive to the satellite with chip synchronization in order to minimize the interference. The packets that are transmitted by the originating earth stations (e.g. 101-1) contain both the address of the destination beam and the recipient earth station address (i.e. the earth station address to which the downlink beam is directed is contained within the packet). The on-board ATM switch, which includes buffer circuits, need only look at the destination beam address and by routing on that address automatically routes all included packets destined for the same beam on the outgoing channel intended for that destination beam (e.g. 301-M, 302-M, 303-M). This is accomplished by putting all the packets for that beam on an outgoing packet buffer.

The receiving satellite transceiver equipment receives a plurality of CDMA spot beams at the receiving amplifiers 201-1 to 201-N. After processing in bulk downconverters 202-1 to 202-N, the received signal is applied to a bulk downconverter followed by a multi-channel CDMA demodulator 203-1 which samples, separates and demodulates the CDMA signals. The signals are processed into I and Q components and despread with discrete time (digital) techniques. Each CDMA channel contains a mix of M-PSK data signals at a variety of data rates. The received signals from all the beams are applied to the ATM switch 250.

Outbound (i.e., downlink) transmission, in TDM format, from the ATM switch 250 is applied to TDM modulators 301-1 to 301-M which include framing and forward error correction (FEC) circuitry. The signals are upconverted in blocks 302-1 to 302-M. The signal are amplified in modules 303-1 to 303-M using traveling wave tube amplifiers (TWTA) or Solid State Power Amplifiers (SSPA) which apply each channel to output bandpass filters in the same modules to suppress harmonics. These outputs are combined into beams at node 304-1 for downlink transmission. Many component and system details of a system incorporating the invention may be found in the FCC filing for a satellite system by AT&T for a satellite communication system filed Sep. 29, 1995.

The invention claimed is:

1. A method of signal processing for efficient multi-user satellite based communication, comprising the steps of:

creating a hybrid CDMA-TDM air interface between earth stations via a satellite; including:
   transmitting uplink CDMA signals in packet format from the earth stations to the satellite;
   demodulating at the satellite the uplink CDMA signals;
   switching the demodulated signals;
   modulating the switched signals into downlink TDM signals;
   combining the uplink CDMA packets into downlink TDM beams by packet switching techniques, such that downlink TDM packets are routed to the TDM beam serving the desired destination defined by packet addresses;
   where uplink CDMA signals are used for uplink communications from an earth station to the satellite and downlink TDM signals are used for downlink communications from the satellite to another earth station.

2. A satellite based communication system, having a plurality of earth stations and a satellite interconnecting earth stations, comprising:
   means for transmitting uplink CDMA signals in packet format from an earth station to the satellite;
   means included within the satellite for creating a hybrid CDMA-TDM air interface between earth stations, including:
   means for demodulating incoming uplink CDMA signals;
   means for switching the demodulated signals;
   means for modulating the switched demodulated signals into downlink TDM signals;
   means for combining the received recovered uplink packets into beams of the TDM downlink signal by packet switching techniques; and
   whereby CDMA signals are used for uplink communications from an earth station to the satellite and TDM signals are used for downlink communications from the satellite to another earth station.

* * * * *